US006832028B2

(12) United States Patent
Gu et al.

(10) Patent No.: US 6,832,028 B2
(45) Date of Patent: Dec. 14, 2004

(54) LIQUID CRYSTAL ADAPTIVE COUPLER FOR STEERING A LIGHT BEAM RELATIVE TO A LIGHT-RECEIVING END OF AN OPTICAL WAVEGUIDE

(75) Inventors: Dong-Feng Gu, Thousand Oaks, CA (US); Donald B. Taber, Newbury Park, CA (US); Bruce K. Winker, Ventura, CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 121 days.

(21) Appl. No.: 10/267,282

(22) Filed: Oct. 8, 2002

(65) Prior Publication Data

US 2004/0067013 A1 Apr. 8, 2004

(51) Int. Cl.$^7$ .............................. G02B 6/26; G02B 6/42
(52) U.S. Cl. ............................ 385/41; 385/16; 385/31; 385/42
(58) Field of Search ......................... 385/16, 31, 39–42

(56) References Cited

U.S. PATENT DOCUMENTS

| 4,011,543 A | 3/1977 | Soref et al. ............. 340/166 R |
| 4,201,442 A | 5/1980 | McMahon et al. ....... 350/96.14 |

(List continued on next page.)

OTHER PUBLICATIONS

Toshiaki Nose et al., Improvement of Optical Properties and Beam Steering Functions in a Liquid Crystal Microlens With an Extra Controlling Electrode by a Planar Structure, (Nov. 2000), Part I, No. 11, The Japan Society of Applied Physics, pp. 6383–6387.

Nabeel A. Riza et al., Communications, Demonstration of a Liquid–Crystal Adaptive Alignment Tweeker for High–Speed Infrared Band Fiber–Fed Free–Space Systems, (Jun. 1998) Society of Photo–Optical Instrumentation Engineers, pp. 1876–1880.

Primary Examiner—Akm Enayet Ullah
Assistant Examiner—Jerry T. Rahll
(74) Attorney, Agent, or Firm—Koppel, Jacobs, Patrick & Heybl

(57) ABSTRACT

An apparatus for optically coupling a light source with a light-receiving end face of an optical waveguide comprises a lens for focusing a light beam emitted from the light source at a focal point on the light-receiving end face of the optical waveguide. An adaptive coupler, positioned in the optical path, is responsive to a beam steering control signal for steering and aligning the focal point relative to the light-receiving end face of the optical waveguide. In one form, the adaptive coupler comprises a pair of transparent substrates having confronting, parallel inner faces, the inner face of one of the pair of substrates carrying a beam intercepting, optically transparent, constant potential electrode and the inner face of the other of the pair of substrates carrying an electrically resistive, beam intercepting, optically transparent film. A pair of spaced apart electrodes in electrical contact with the film apply a linear voltage gradient along the film. An electro-optical phase shifting medium is disposed between the confronting inner faces of the substrates. The application of selected voltages to the electrodes creates a linear voltage gradient along the aforementioned film on the inner face of the one substrate resulting in a linearly varying electric field between that film and the constant potential electrode creating a corresponding linear variation in the refractive index of the liquid crystal medium and a linear wavefront tilt in the intercepting optical beam.

20 Claims, 8 Drawing Sheets

U.S. PATENT DOCUMENTS

| | | | |
|---|---|---|---|
| 4,278,327 A | 7/1981 | McMahon et al. | 350/347 V |
| 4,385,799 A | 5/1983 | Soref | 350/96.19 |
| 4,852,962 A | 8/1989 | Nicia | 350/96.2 |
| 4,964,701 A | 10/1990 | Dorschner et al. | 350/336 |
| 4,988,157 A | 1/1991 | Jackel et al. | 350/96.13 |
| 5,018,835 A | 5/1991 | Dorschner | 350/336 |
| 5,093,747 A | 3/1992 | Dorschner | 359/316 |
| 5,255,332 A | 10/1993 | Welch et al. | 385/17 |
| 5,333,077 A | 7/1994 | Legar et al. | 359/619 |
| 5,436,990 A | 7/1995 | Head et al. | 385/34 |
| 5,440,654 A | 8/1995 | Lambert, Jr. | 385/17 |
| 5,594,565 A | 1/1997 | DeJule et al. | 349/19 |
| 5,617,109 A | 4/1997 | DeJule et al. | 345/87 |
| 5,617,492 A | 4/1997 | Beach et al. | 385/33 |
| 5,963,682 A | 10/1999 | Dorschner et al. | 385/16 |
| 5,978,527 A | 11/1999 | Donald | 385/17 |
| 6,727,968 B1 * | 4/2004 | Bryan-Brown et al. | 349/123 |

* cited by examiner

LIQUID CRYSTAL ADAPTIVE COUPLER FOR STEERING A LIGHT BEAM RELATIVE TO A LIGHT-RECEIVING END OF AN OPTICAL WAVEGUIDE

BACKGROUND OF THE INVENTION

1. Field of the Invention

The present invention relates generally to optical beam steering and particularly to an optical system utilizing the electro-optical properties of liquid crystals to steer a light beam relative to a light-receiving end of an optical waveguide such as an optical fiber.

2. Description of the Related Art

N×N optical cross connect switches used, for example, in telecommunications systems, optically couple any one of N input optical fibers to any one of N output optical fibers. Such switches comprise examples of systems that make use of various techniques for deflecting or steering a light beam emitted from a light source, in this case the light-emitting end of a selected one of the N input fibers, to the light-receiving end of an optical waveguide, here in the form of a selected one (and in some cases, more than one) of the N output fibers.

One conventional optical beam steering technique applies diffractive beam steering that exploits the electro-optical properties of liquid crystals. This approach is analogous to the use of phased-array antennas for directing microwave radiation in radar systems and is the subject of a number of patents, for example, U.S. Pat. No. 5,093,747 to Dorschner and U.S. Pat. No. 5,963,682 to Dorschner, et al. These patents disclose a liquid crystal beam steering device comprising an optical beam phase shifting liquid crystal cell having a pair of spaced apart, parallel, superposed windows optically transparent at the wavelengths of interest. The pair of windows have inner, confronting surfaces. An electrically conductive, optically transparent (or reflective) common or ground plane electrode is affixed to the inner surface of one of the windows. A plurality of parallel, electrically conductive, optically transparent stripe electrodes are affixed to the internal surface of the other window. The space between the confronting electrode-bearing surfaces of the windows is filled with a layer of liquid crystal molecules, typically of the long, thin, rod-like organic type of the nematic phase. A periodic staircase waveform comprising voltage steps applied to the stripe electrodes creates corresponding local variations in the refractive index of the liquid crystal layer in such a manner as to form a diffraction grating of adjustable period. Thus, the wavefront of a light beam that emerges from the liquid crystal cell is tilted with respect to that of the incident wavefront. In this fashion, the optical beam phase shifting liquid crystal cell provides controllable beam steering as a function of the electrical potentials applied to the stripe electrodes. This conventional phased-array beam steering technique is digital in nature, with discrete voltages applied to the stripe electrodes (each representing a pixel) producing a stepped or staircase variation in the refractive index of the liquid crystal layer and a corresponding stepped or staircase variation in the optical phase delay during the transit of a light beam through the liquid crystal layer.

A drawback of striped electrode liquid crystal cell beam steering devices is that they tend to introduce crosstalk due to diffraction. Another disadvantage of striped electrode beam steerers systems is that they limit the available beam steering angles to discrete angular increments. This limitation results from the digital nature of these devices as well as from the striped electrode interconnection and drive schemes. In a conventional striped electrode liquid crystal cell, not all of the electrode elements are electrically independent; rather, every nth electrode is typically connected together to form periodically repeating electrode series or subarrays. The addressable beamsteering angles are restricted to those that correspond to integer multiples of 360 degree ($2\pi$) phase ramps across each electrode subarray. Although large subarrays can accommodate many possible integer factors (and thus many steerable angles), the steerable angle is still limited to discrete increments; it is not continuously variable.

U.S. Pat. No. 4,852,962 discloses an optical fiber switch for switching light from one input fiber to any one of several output fibers. The switch includes a light deflection or steering cell consisting of two glass plates, nematic liquid crystal material between the glass plates, and spacers and electrodes formed on both sides of elongated electrode holders disposed along opposite edges of the glass plates, that is, along opposite sides of the light beam whose direction is to be controlled. Each electrode pair is controlled by an independent voltage source. The '962 patent states that when the intensity of the electric fields produced on the two sides of the beams differ, different orientations of the nematic crystal material occur across the beams, and depending on the difference in the field strength between the two electrode pairs the light beams are deflected through a larger or smaller angle. The deflections of the light is said to determine which one of the multiplicity of output fibers receives the light emitted form the single input fiber. A "continuous gradient" of refractive index is said to be formed across the light beams, but the '962 patent does not make clear how this is achieved, nor does the patent describe the distribution of the "gradient", for example, whether it is linear.

Liquid crystal beam steering devices of the prior art deflect a light beam to couple a selected input optical fiber with a selected one (or more) output fiber(s). None of those devices deal with the problem of aligning the light beam relative to the light-receiving end(s) of the selected output fiber(s) to correct, for example, for the angle of the incident or emitted beam or for lens imperfections. In an N×N optical switch, the focal points of the light beams passing through the coupling lenses must precisely align with the receiving end surfaces of the output optical fibers to minimize coupling losses. A misalignment of even a few microns substantially reduces the optical coupling efficiency and, as N increases even modestly, the number of different combinations of connections (N!) becomes very large. Thus, to mechanically fix the relative positions of the fiber ends, microlenses and other optical elements so that each input fiber is properly aligned optically with all of the output fibers would be extremely difficult and costly.

FIG. 1 is a graph showing the rapid decrease in coupling efficiency as a function of fiber position error for a commonly used communication optical fiber, namely, a single mode fiber having a core diameter of 8 microns and a numerical aperture of 0.092. For example, it will be seen that for a fiber misalignment of 4.5 microns, the coupling efficiency is halved. Spatial registration precision of 1–2 microns and 1/10° of angular precision are required for adequate coupling efficiency.

SUMMARY OF THE INVENTION

It is therefore an overall object of the present invention to provide an improved optical beam steering device.

It is another object of the invention to provide an optical beam steering device that improves the optical coupling efficiency between a source of the beam and a receiving optical waveguide.

It is a further object of the present invention to provide an optical beam steering device that improves the optical coupling efficiency between an input optical waveguide and an output optical waveguide.

It is a further object of the present invention to provide an optical beam steering device that improves the optical coupling efficiency between an input optical waveguide and an output optical waveguide by correcting for imperfections in one or more lenses disposed in the optical path and/or for misalignments of the input and/or output optical waveguides.

It is a further object of the present invention to provide an optical beam steering device that improves the optical coupling efficiency between an input optical waveguide and an output optical waveguide while allowing relaxation of the mechanical tolerances of the various optical components disposed along the optical path.

It is yet another, and more specific, object of the present invention to provide a liquid crystal beam steering device that improves the optical coupling efficiency between the input and output optical fibers of an optical switch by controlling the position of the focal point of a light beam emitted from an input fiber relative to the light-receiving end of an output fiber.

It is still a further object of the present invention to provide a liquid crystal beam steering device that improves the optical coupling efficiency between the input and output optical fibers of an optical switch by precisely aligning the focal point of a light beam emitted from an input fiber with the light-receiving end of an output fiber thereby permitting relaxation of the mechanical tolerances of the switch structure.

In accordance with the broader aspects of the present invention, there is provided an apparatus for optically coupling a light source with a light-receiving end face of an output optical waveguide along an optical path, in which the apparatus comprises a lens positioned in the optical path for focusing a light beam emitted from the light source at a focal point on the light-receiving end face of the output optical waveguide; and an adaptive coupler positioned in the optical path, the adaptive coupler being responsive to a beam steering control signal for steering the focal point relative to the light-receiving end face of the output optical waveguide to align the focal point with said light-receiving end face. In one form of the invention, the light source comprises a light-emitting end face of an input optical waveguide and the input and output optical waveguides comprise optical fibers.

In accordance with a more specific aspect of the present invention, there is provided an adaptive coupler for steering an optical beam, the adaptive coupler comprising a pair of transparent substrates having confronting, parallel inner faces, the inner face of one of the pair of substrates carrying a beam intercepting, optically transparent, constant potential (typically ground) electrode and the inner face of the other of the pair of substrates carrying an electrically resistive, beam intercepting, optically transparent film; a pair of spaced apart electrodes in electrical contact with the film for applying a potential gradient along the film; and an electro-optical phase shifting medium disposed between the confronting inner faces of the pair of substrates. The electro-optical phase shifting medium comprises a liquid crystal medium, and preferably a dual frequency liquid crystal medium enabling high speed redirection of the optical beam. The optically transparent film may comprise a material having an electrical resistivity, preferably zinc oxide doped with alumina.

As is known, the application of an electric field to a layer of liquid crystal molecules affects the retardance and hence the speed of light therethrough. Thus, the application of a linear voltage gradient along the aforementioned film on the inner face of the one substrate results in a linearly varying electric field between that film and the constant potential electrode creating a corresponding linear variation in the refractive index of the liquid crystal medium and a linear wavefront tilt in the intercepting optical beam.

In accordance with yet another aspect of the present invention, 2-dimensional beam steering may be provided by stacking two adaptive couplers with their field gradients crossed. Thus, the adaptive coupler described above may further include a second pair of transparent substrates having confronting, parallel inner faces, the second pair of substrates being disposed parallel with the first-mentioned pair of substrates, the inner face of one of the second pair of substrates carrying a beam intercepting, optically transparent electrode and the inner face of the other of the second pair of substrates carrying an electrically resistive, beam intercepting, optically transparent film, preferably of a material such as doped zinc oxide; a pair of spaced apart electrodes in contact with the film for applying a potential gradient across the film in a direction perpendicular to the direction of the first-mentioned potential gradient; and an electro-optical phase shifting medium, preferably a dual frequency liquid crystal, disposed between the confronting faces of the second pair of substrates.

In accordance with one specific, exemplary application of the present invention, there is provided an optical switch for optically coupling the light-emitting end of a selected one of a plurality of input optical waveguides, such as optical fibers, with the light-receiving end of a selected one of a plurality of output optical waveguides, such as optical fibers. The optical switch comprises a switch array for selectively deflecting a light beam from the light-emitting end of the selected one of the plurality of input optical waveguides to the light-receiving end of the selected one of the plurality of output optical waveguides. The switch further comprises a lens for focusing the light at a focal point on the light-receiving end of the selected one of the plurality of output optical waveguides. Last, the switch includes an adaptive coupler, as already described, for steering the focal point relative to the light-receiving end of the selected one of the plurality of output optical waveguides to align the focal point with the light-receiving end. Other forms of optical waveguide switches and couplers are of course possible; a selected one of multiple input waveguides may be coupled to a single output waveguide, and vice versa. In all instances, the adaptive coupler of the present invention corrects for system inaccuracies such as beam misalignments and lens aberrations to improve optical coupling efficiency.

BRIEF DESCRIPTION OF THE DRAWINGS

The foregoing and other objects, features and advantages of the invention will be evident to those skilled in the art from the detailed description, below, taken together with the accompanying drawings, in which.

DETAILED DESCRIPTION OF THE PREFERRED EMBODIMENTS

It will be evident to those skilled in the art that the present invention has broad utility, being applicable, by way of example and not limitation, to cross bar switches; filter arrays; attenuator arrays; antenna arrays; laser systems utilizing, for example, laser diode sources for communications or other purposes; and so forth, employing optical channels or waveguides which may take the form of optical fibers.

Figure 2:
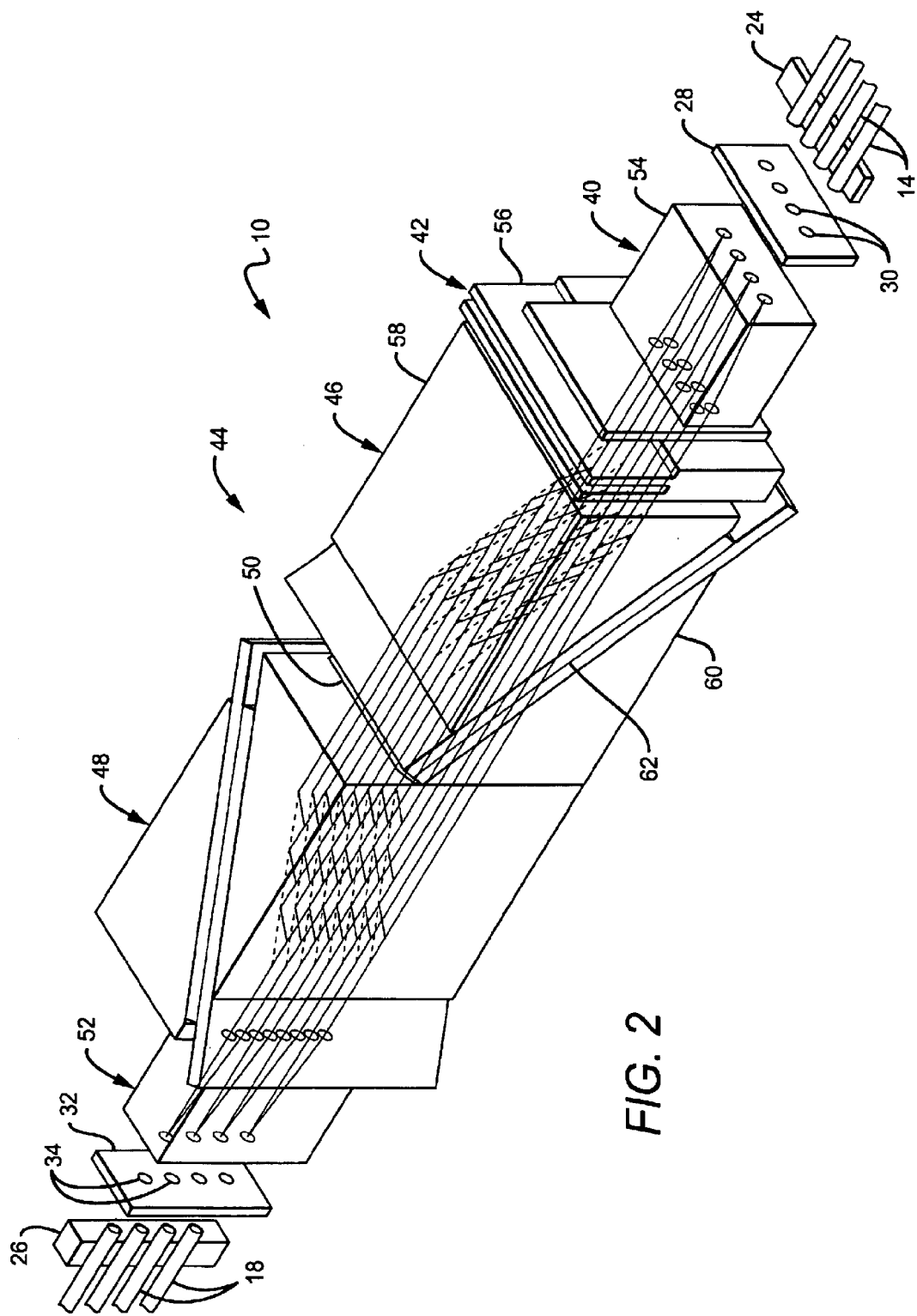
FIG. 2 is a phantom, perspective view of an N×N liquid crystal optical cross connect switch incorporating an adaptive coupler in accordance with the present invention.

With reference to FIG. 2, there is shown a specific example of how the present invention may be applied. The example of FIG. 2 comprises a form of an N×N liquid crystal optical cross connect switch 10 for use, for example, in a data communications or telecommunications system.

In the specific, exemplary N×N optical switch shown in FIG. 2, N=4 so that the switch 10 can couple any selected one of four longitudinally oriented input fibers 14 with any selected one of four longitudinally oriented output fibers 18.

A support 24 secures the light-emitting ends of the input fibers 14 in predetermined positions along a horizontal plane. Similarly, a support 26 secures the light-emitting ends of the output fibers 18 in predetermined positions along a vertical plane.

Adjacent to the light-emitting ends of the input optical fibers 14 is an input microlens structure 28, preferably fabricated from a monolithic silicon body, defining a row of four collimating lenses 30 with each lens disposed in axial alignment with the light-emitting end of one of the input fibers 14. Similarly, an output microlens structure 32 defines a row of four lenses 34 in axial alignment with respective ones of the light-receiving ends of the output fibers 18, for focusing light on the light-receiving ends of the output fibers.

The optical switch 10 includes an input optical device 40 for converting the collimated, unpolarized input light beam from each of the lenses 30 of the input microlens structure 28 into linearly polarized light; an adaptive coupler 42 that is the principal subject of the present invention; an optical cross connect switching means 44 comprising first and second liquid crystal switch devices 46 and 48 sandwiching a half-wave, polarization rotating plate 50; and an output optical device 52 for reconverting polarized light beams into unpolarized beams.

The input optical device 40 comprises the combination of a double-refracting crystal 54 of, for example, optical calcite, and an optically transparent, patterned plate 56 consisting of polarization rotator sections alternating with glass filler sections. The double-refracting calcite crystal 54 splits the incident beam from each of the lenses 30 to produce two wave fronts, ordinary and extraordinary. The ordinary, non-deflected beam has a first polarization direction which is retained after passing through a glass filler section of the plate 56. The extraordinary or deflected beam has a second polarization direction, perpendicular to the first direction, and after passing through a half-wave section of the plate 56 has the same polarization direction as the ordinary beam. The output optical device 52, which is structurally similar to the input optical device 40, recombines the linearly polarized ordinary and extraordinary beams into beams of unpolarized light focused on the ends of the output fibers 18 by the output microlens structure 32.

The structure and operation of the optical cross connect switching means 44 is explained in U.S. Pat. No. 4,385,799, incorporated herein by reference. Briefly, the first and second liquid crystal switch devices 46 and 48 forming part of the optical cross connect switching means 44 comprise identical liquid crystal switch devices having a 90° relative angular orientation. For example, the first switch device 46 consists of a pair of transparent glass prisms 58 and 60 sandwiching between their inclined faces a liquid crystal matrix switch array 62. The liquid crystal matric switch arrays of the devices 46 and 48 selectively deflect light from the input optical fibers 14 to the output fibers 18.

It will be understood that the optical switching means 44 shown in FIG. 2 is merely one example of switching arrangements that can be employed in connection with the present invention. Another example of an optical switching means that may be used is a reflective, spatial light modulator employing MEMS (micro electromechanical system) technology composed of an electronically addressable, planar x-y grid array of micro-mirrors coupling coplanar arrays of input and output optical fibers.

Figure 1:
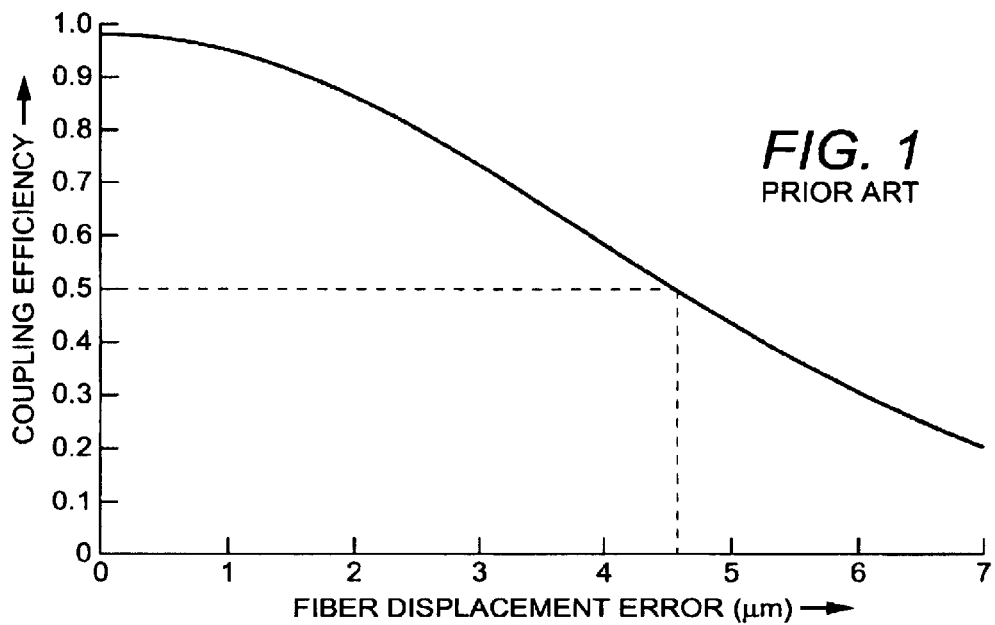
FIG. 1 is a graph of fiber coupling efficiency as a function of lateral fiber misalignment.
Figure 3:
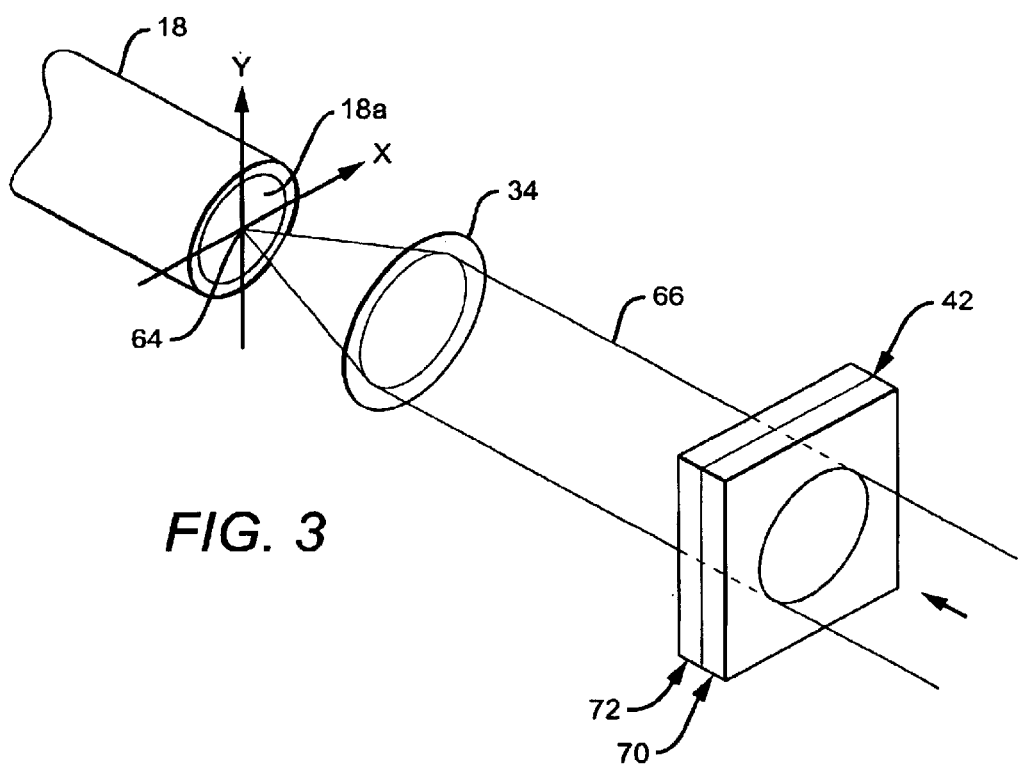
FIG. 3 is a simplified perspective view illustrating the relationship between an adaptive coupler in accordance with the invention and the light-receiving end of an output optical fiber.

Abutting the planar input end of the first liquid crystal switch device 46 is the adaptive coupler 42 that is the principal subject of the present invention. With reference now also to FIG. 3, there is shown in simplified form a receiving or output optical waveguide in the form of an optical fiber 18 having a light-receiving end surface 18a upon which is focused at a focal point 64 a light beam 66 passing through one of the lenses 34 of the output microlens structure 32. The adaptive coupler 42, only a small portion of which is shown in FIG. 3, provides 2-dimensional, that is, x-direction and y-direction, steering of the position of the focal point 64 of the light beam 66 incident on the light-receiving end 18a of the output fiber 18. It will be apparent that instead of receiving, the fiber 18 may comprise a transmitting waveguide in which case the end surface 18a functions as a light-emitting surface.

Figure 4:
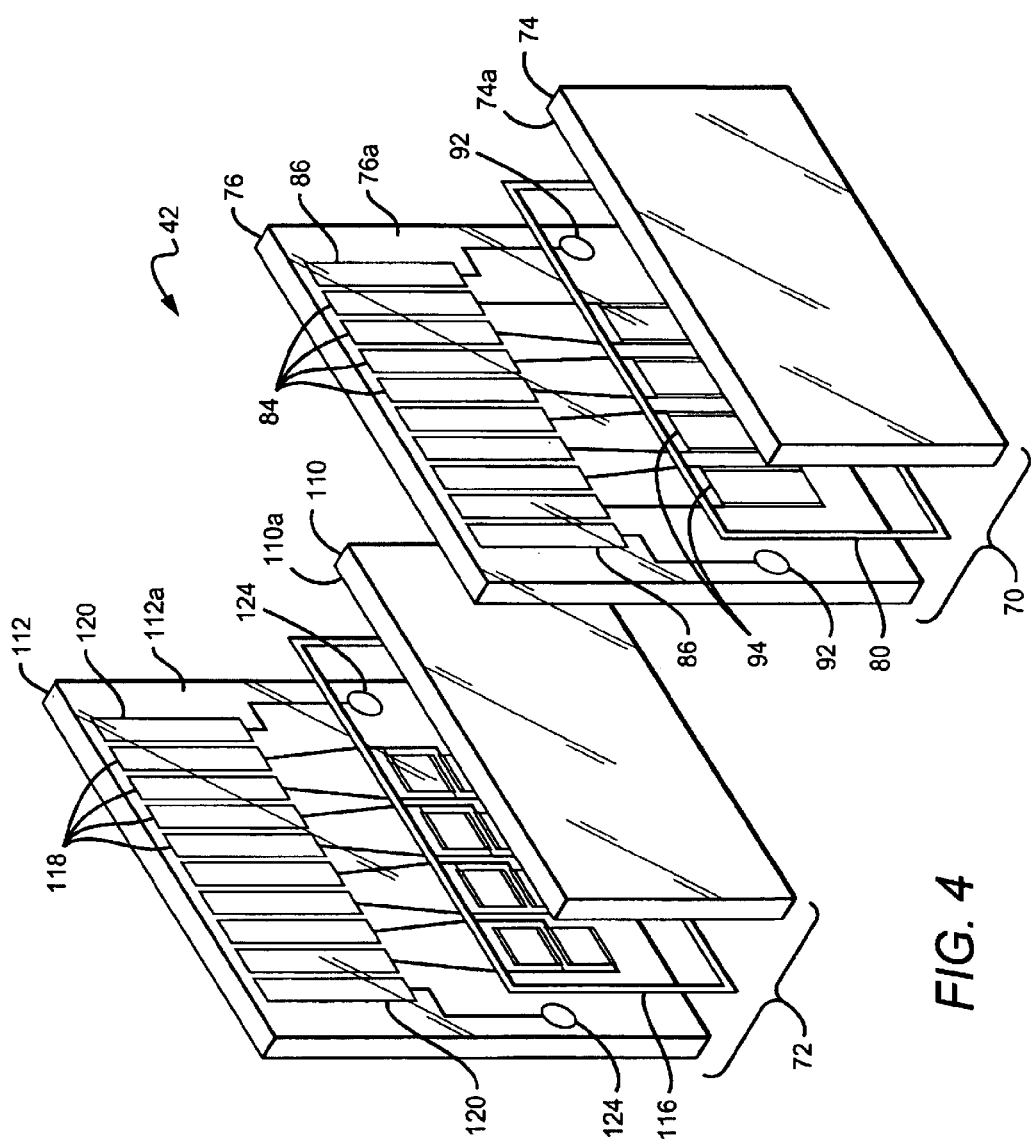
FIG. 4 is a perspective view of portions of an adaptive coupler in accordance with the present invention.
Figure 5:
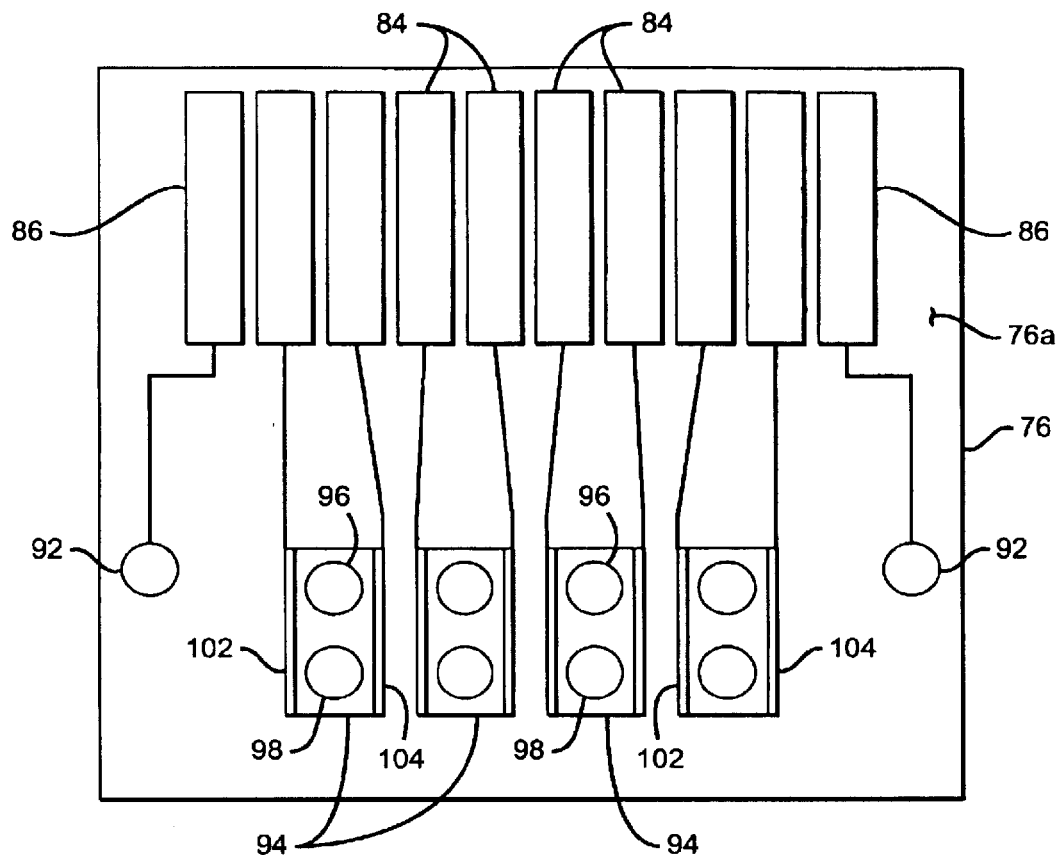
FIG. 5 is a front elevation view of one of the substrates of an x-direction adaptive coupler in accordance with the invention.
Figure 6:
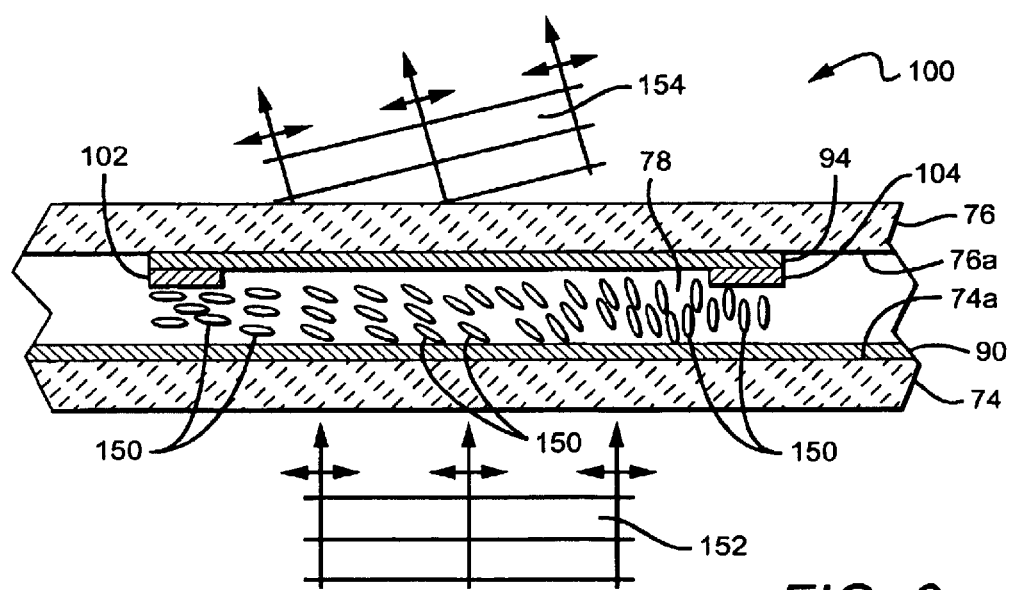
FIG. 6 is a top plan view, in cross section, of a typical x-direction adaptive coupler cell according to the invention.

With reference now also to FIGS. 4-6, the adaptive coupler 42 comprises stacked, x-direction and y-direction adaptive couplers 70 and 72, respectively, each employing the optical phase shifting properties of a thin planar layer of nematic liquid crystal molecules controlled by an electric field. More specifically, the x-direction adaptive coupler 70 comprises first and second rectangular windows or glass substrates 74 and 76 having flat, polished, confronting inner surfaces 74a and 76a, respectively, separated by a small gap of, for example, about 12 microns. The glass substrates 74 and 76 are optically transparent at the wavelength of interest, for example, 1.55 microns in the near IR region of the electromagnetic spectrum. The inner surfaces 74a and 76a of the substrates are separated by a thin layer 78 of nematic phase liquid crystal material confined within a peripheral seal 80. Although various liquid crystal materials may be used, a dual frequency liquid crystal is preferred to enable faster steering direction changes, as explained below. Formed along an upper portion of the surface 76a is an array of x-direction control voltage contacts 84 flanked by a pair of contacts 86, typically held at ground potential.

Covering the entire inner surface 74a is a thin film 90 of electrically conductive material transparent at the wavelength of interest. The film 90, which may be 90 nm thick, serves as a constant potential, common electrode which will typically take the form of a ground plane electrode. The film 90 may be formed on the surface 74a by any known deposition technique including sputtering and vacuum deposition. Various materials may be employed, by way of example and not limitation, indium tin oxide (ITO) and doped zinc oxide. Of these, zinc oxide with a 2% $Al_2O_3$ (alumina) dopant is preferred because of its stable refractive index and ease of controlling the film resistivity by controlling the process conditions. For example, vacuum deposition at a high temperature, for example, about 300° C., produces a film of relatively low resistivity since most of the dopants are activitated. On the other hand, low temperature vacuum deposition (about 150° C.) followed by high temperature annealing (about 250° C.) produces a film of relatively high resistivity. The process conditions for forming the constant potential electrode film 90 are such that the film 90 has a low sheet resistivity of, for example, 200–500 ohms per square.

Formed on the inner surface 76a of the substrate 76 along each side edge of the substrate is a contact pad 92 of, for example, silver epoxy for electrically coupling the contacts 86 and the film 90.

A pattern of electrically conductive films 94 and associated electrodes defining with the constant potential electrode film 90 individual, single pixel, x-direction adaptive coupler cells 100 is formed on the inner surface 76a of the substrate 76 using known deposition techniques. FIG. 5 shows the x-direction cell layout on the inner surface 76a of the substrate 76.

A typical x-direction adaptive coupler cell 100 is shown schematically in cross section in FIG. 6 with the size of the elements greatly enlarged for clarity. Like the film 90, the thin films 94 are made of electrically conductive material transparent at the wavelength of interest. Various materials may be employed including, by way of example and not limitation, indium tin oxide (ITO) and doped zinc oxide. Again, of these, zinc oxide with a 2% $Al_2O_3$ (alumina) dopant is preferred. The films 94 may be about 90 nm thick and may be formed on the surface 76a by any known deposition technique including sputtering and vacuum deposition. Using low temperature vacuum deposition followed by high temperature annealing produces films 94 with a relatively high sheet resistivity of, for example, 10–50 kilohms per square. By way of example and not limitation, the height and width of each film 94 may be about 940 microns and 440 microns, respectively, with the lateral separation between adjacent cells being about 100 microns. The films 94 thus have a height sufficient to intercept both the ordinary rays 96 and the extraordinary rays 98 formed by the input double-refractive optical device 40. For simplicity, the alignment coatings over the films 90 and 94 have been omitted from the drawings; such coatings and the manner in which they are formed are well known to those skilled in the art.

Each film 94 functions to apply a continuous, linear voltage gradient, and thus a linear refractive index or phase gradient, along the width of the adaptive coupler cell 100.

Formed over each film 94 along the vertical, parallel edges thereof are elongated, spaced apart electrodes 102 and 104 each having a width of, for example, 20 microns. Each of the electrodes 102 and 104 is connected to one of the terminal strips 84.

Figure 7:
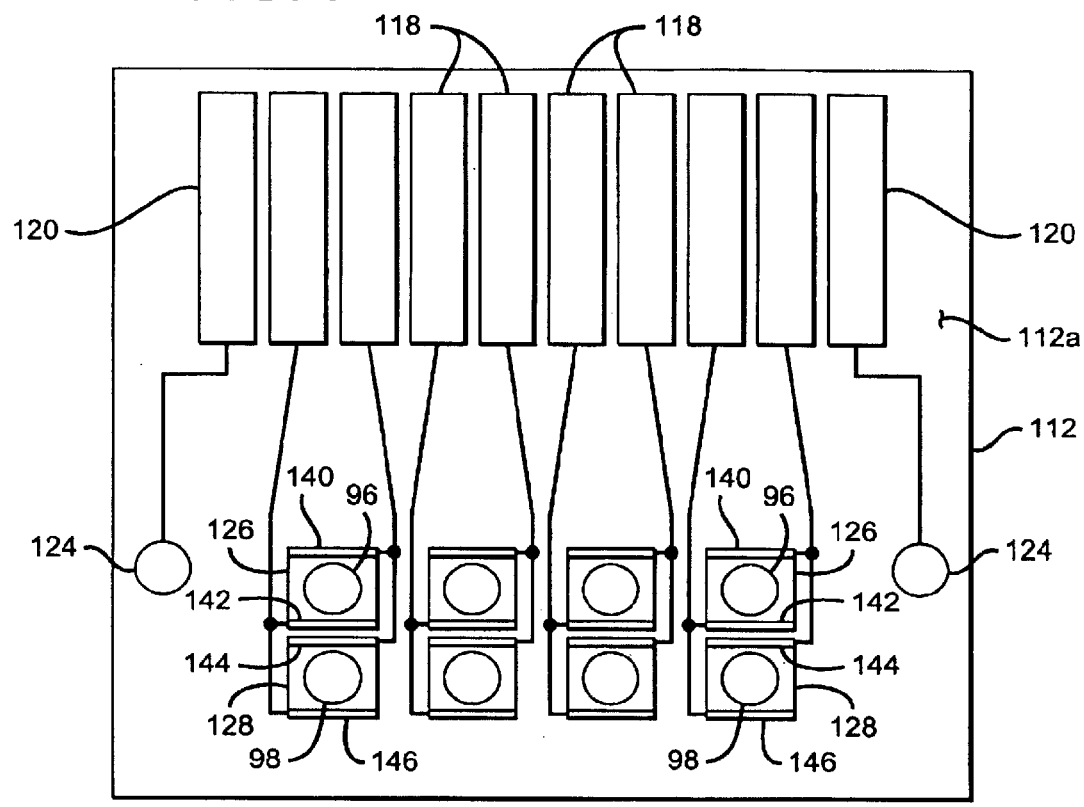
FIG. 7 is a front elevation view of one of the substrates of a y-direction adaptive coupler in accordance with the invention.
Figure 8:
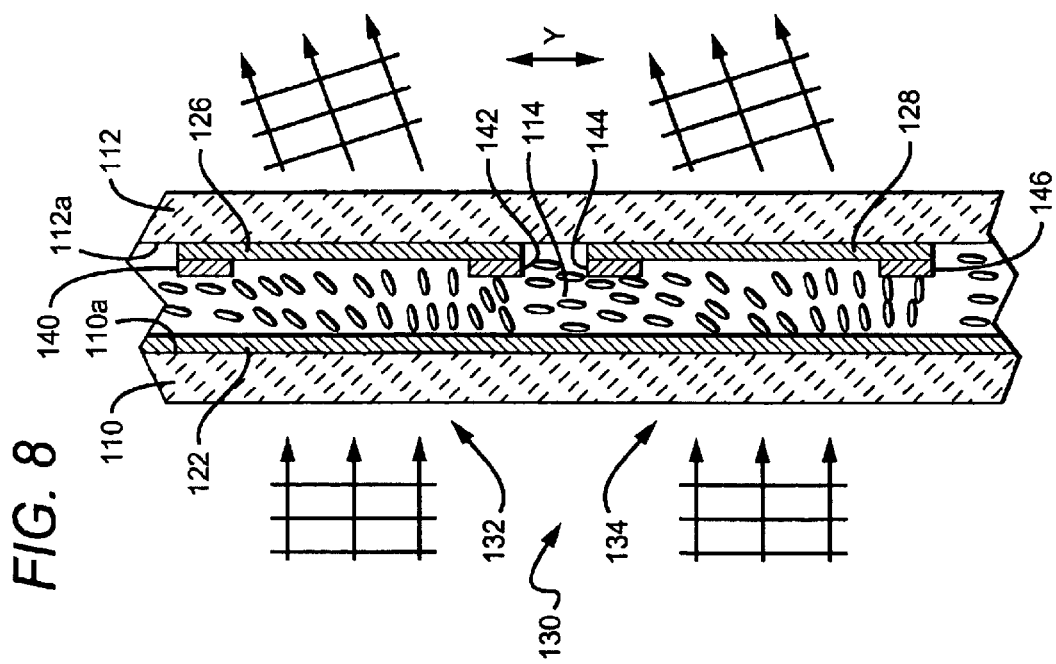
FIG. 8 is a side elevation view, in cross section, of a typical y-direction adaptive coupler cell according to the invention.

With reference to FIGS. 4, 7 and 8, the y-direction adaptive coupler 72, like the x-direction coupler 70, comprises first and second optically transparent, rectangular glass substrates 110 and 112 having confronting inner surfaces 110a and 112a, respectively, separated by a thin layer 114 of, for example, nematic phase liquid crystal material, preferably of the dual phase type, contained within a peripheral seal 116. As in the x-direction adaptive coupler 70, the gap between the confronting surfaces 110a and 112a may be about 12 microns.

Formed along an upper portion of the surface 112a is an array of y-direction control voltage contacts 118 flanked by a pair of contacts 120 which typically will be maintained at ground potential.

Covering the entire inner surface 110a is a thin film 122 of electrically conductive material optically transparent at the wavelength of interest. The film 122, whose composition, formation, thickness and electrical properties may be identical to those of the film 90 on the surface 74a of the x-direction substrate 74, serves as a constant potential (typically ground plane) electrode. Formed on the inner surface 112a of the substrate 112 along each side edge of the substrate is a contact pad 124 of, for example, silver epoxy for electrically coupling the film 122 with the contacts 120 when the substrates 110 and 112 are in their assembled state.

Formed on the inner surface 112a of the substrate 112 are identical, upper and lower, horizontally oriented rows of four spaced apart, electrically conductive films 126 and 128, respectively, arranged in vertically aligned pairs. Each of the four pairs of films 126 and 128 defines with the constant potential film electrode 122 a y-direction adaptive coupler cell 130 in longitudinal alignment with one of the x-direction cells 100. By way of example, the height and the width of each of the films 126 and 128 may be about 500 microns and 440 microns, respectively, with the lateral separation between adjacent film pairs being about 50 microns. Each y-direction cell 130 consists of an upper half cell 132 (defined by the upper film 126) and a lower half cell 134 (defined by the lower film 128), with an ordinary ray 96 of each light beam intercepting the upper half cell 132 and an extraordinary ray 98 intercepting the lower half cell 134.

Parallel, horizontal electrodes 140 and 142 formed over each upper half cell film 126 extend, respectively, along the upper and lower edges of each of the films 126; similarly, parallel, horizontal electrodes 144 and 146 formed over each of the lower half cell films 128 extend, respectively, along the upper and lower edges of each of the films 128. Each of the electrodes may have a width of, for example, 20 microns.

The films 126 and 128 on the inner surface 112a of the glass substrate 112, with a sheet resistivity of, for example, 10–50 KΩ per square, function to apply a continuous, linear voltage gradient, and thus a linear refractive index or phase gradient, along the height of each half cell in response to voltages applied to the electrodes 140 and 142, and the electrodes 144 and 146.

It will be seen in FIG. 7 that the upper electrodes 140 and 144 on each pair of half cell films 126 and 128 are connected to a common control voltage contact 118 and that the lower electrodes 142 and 146 of each pair of the half cell films are likewise connected to a common control voltage contact 118. In this way, identical potential differences will be generated across the heights of the half cell pairs 132 and 134 of a given y-direction cell 130. Again, as in FIG. 6, FIG. 8 omits the liquid crystal alignment layers which are well known to those skilled in the art.

As is known, the application of an electric field to a layer of liquid crystal molecules affects the retardance and hence the speed of light therethrough. Thus, with reference to FIG. 6, by way of example, the application of a linear voltage gradient along the high resistivity film 94 between the edge electrodes 102 and 104 results in a linear electric field gradient along the horizontal direction as viewed in FIG. 6 in the region between the film 94 and the constant potential film 90 thereby creating a corresponding linear variation in the refractive index of the liquid crystal layer 78. In FIG. 6, the ellipsoids 150 represent the thin, rod-like liquid crystal molecules with their orientations as they would appear under the varying electric field. The left edge of the cell 100 (as seen in FIG. 6) with the smallest voltage (1.5 volts, for example) applied to the electrode 102 produces little or no rotation of the molecules 150 from their horizontal orientation while the largest applied voltage (5.5 volts, for example) applied to the electrode 104 along the right hand edge of the cell 100 produces substantial rotation of the molecules. For a uniform surface anchoring, the angular orientation of the molecules 150 depends on the local electric field strength and the elastic constants of the liquid crystal medium. These variations in angular orientation of the liquid crystal molecules cause a differential phase shift across the cross section of the polarized light beam 152 incident on the cell. The phase shift of the exiting polarized beam 154 relative to that of the incident beam 152 correspondingly varies linearly to define the direction of the exiting beam 154 relative to that of the incident beam 152. Control of the voltages applied to the electrodes 102 and 104 precisely determines the position of the focal point 64 (FIG. 3) of the exiting beam relative to the light-receiving (or emitting) end 18a of the optical fiber selected 18 by the optical switch. The y-direction adaptive coupler cells 130 operate similarly. With their field gradients parallel to the y-direction and the rubbing direction the same as the x-direction, each set of adaptive coupler cells, comprising an x-direction cell 100 and a corresponding pair of y-direction half cells 132 and 134 provides 2-dimensional steering of the ordinary and extraordinary rays 96 and 98 of an individual light beam emitted from one of the input fibers 14.

To assure that the tilt angle of the light rays exiting from each of the x-direction and y-direction cells varies linearly with the voltage applied to the cell electrodes thereby providing the steering control precision necessary to minimize optical coupling losses, two relationships must be maintained. First, as already indicated, the voltage gradient across each of the high resistivity films 94, 126 and 128 must be substantially linear and second, the relative phase change must be a substantially linear function of the driving voltage. With respect to the second condition, the graph of FIG. 9 demonstrates that there is a region in which the relative phase change produced by a liquid crystal varies substantially linearly with the applied voltage.

Figure 9:
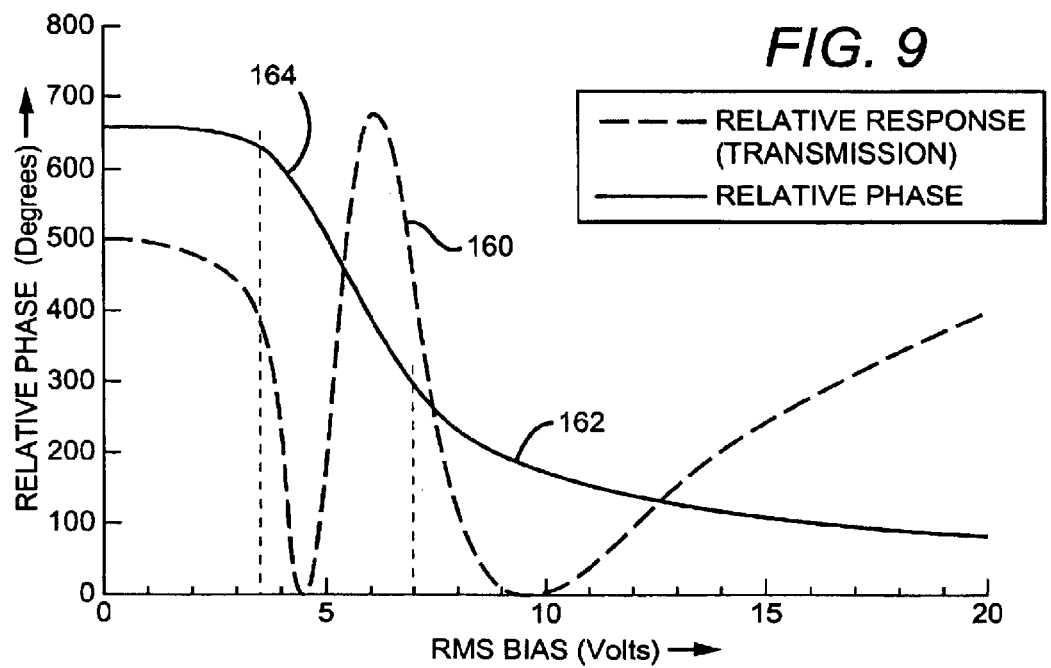
FIG. 9 is a graph showing, for a 1.55 micron wavelength beam, a curve of relative response (light transmission) and a curve of relative phase as functions of the voltage applied to the electrodes of a liquid crystal cell between a pair of parallel polarizers.

FIG. 9 shows two curves 160 and 162. The curve 160 is light transmission as a function of driving voltage for a beam with a 1.55 micron wavelength passed through a polarizer, a test liquid crystal cell, and a parallel analyzer. The rubbing direction of the liquid crystal in the cell is oriented at 45 degrees with respect to the polarizer and analyzer. For such an arrangement, the peaks of the transmission curve 160 correspond to an integer number of 360 degree phase differences between the ordinary and the extraordinary beams, or, in other words, the optical path difference between the two orthogonal polarizations at these peaks is at integer multiples of the wavelength. The valleys on the curve occur at optical path length differences of odd number half wavelengths. For instance, the single peak on the curve occurs at 1.55 micron (one wavelength) path length difference or 360 degrees phase change in the optical beam. One of the two valleys at 9.5 volts corresponds to a half wavelength path length difference or 90 degrees polarization rotation. The other valley at 4.5 volts corresponds to one-and-one-half wavelength path length difference. The relative phase curve 162 in FIG. 9 is the phase difference calculated from the transmission curve using the formula, $I(v)=I0 \times \sin[\phi(v)/2] \times \sin[\phi(v)/2]$, where I is the transmission as a function of driving voltage, I0 is the peak value of the transmission, $\phi(v)$ is the relative phase difference between the ordinary beam and the extraordinary beam as a function of the driving voltage. The relative phase curve 162 indicates that there is a region 164, between about 3.5 volts and 7.0 volts, in which the phase change is nearly a linear function of driving voltage. If a polarized beam passes through such a liquid crystal window across which the voltage has a linear gradient, the wavefront of the beam will be tilted without distortion, resulting in a distortion-free change of the beam propagation direction.

As indicated, use of a dual frequency liquid crystal (DFLC) material is preferred for both x-direction and y-direction adaptive couplers. Utilizing the cell electrode layouts of FIGS. 5 and 7 enables use of DFLC to overcome another drawback of prior art beam steering devices wherein, switching speeds at the important 1.55 micron near infrared communication wavelength are limited to below approximately 50 Hz. This limitation results from the relatively slow relaxation of nematic crystals as they settle from driven to relaxed states. Dual frequency liquid crystal material has a dielectric coefficient (for at least one polarization) which varies as a function of the frequency of an oscillating electrical excitation applied to the material.

In nematic DFLC materials, the parallel dielectric coefficient is highly dispersive. "Dielectric anisotropy" is the difference between the distinct dielectric coefficients (i) for electric fields which are parallel to, and (ii) for electric fields perpendicular to, the nematic director of the liquid crystal. In nematic DFLCs the dielectric anisotropy varies as a function of the frequency of an excitation voltage applied to the material. This feature causes the dielectric anisotropy to change sign at a defined frequency, specifically referred to as a "crossover frequency". This property allows such materials to be rapidly driven to any phase delay state by controlling the amplitude and frequency of a driving excitation.

Dual frequency nematic liquid crystals with properties suitable for use in liquid crystal beam steerers are available commercially from, for example, Chisso Corporation, Tokyo, Japan.

Figure 10:
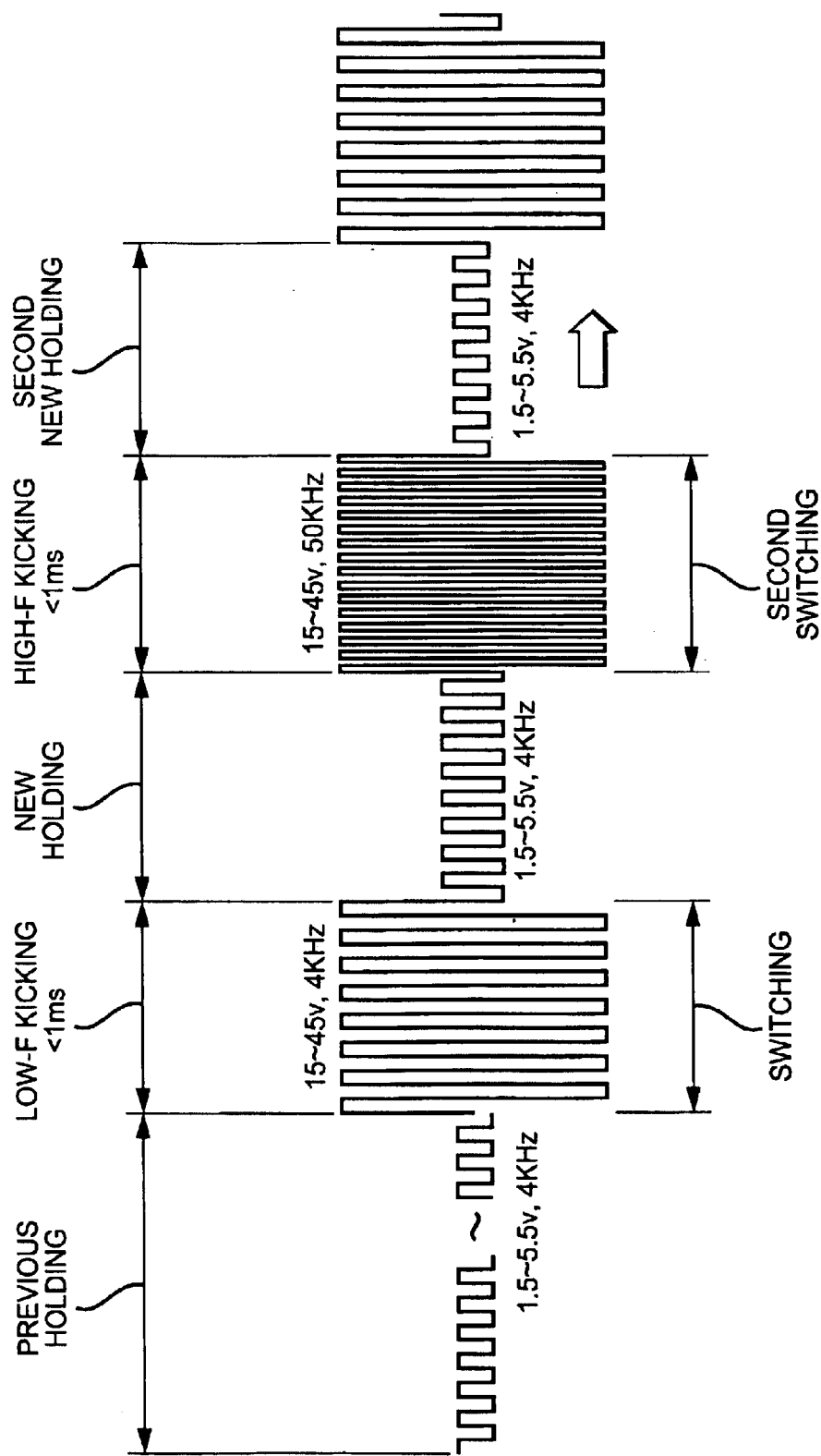
FIG. 10 shows the waveforms of drive voltages applied to a dual frequency liquid crystal cell for accelerating the reorientation of the liquid crystal molecules.

FIG. 10 shows the waveforms of the drive voltages applied to the electrodes of the x-direction and y-direction cells using DFLC material. The holding voltages correspond to the applied voltages when a linear voltage gradient is created. The kicking voltages in both the low and the high frequency regions accelerate the reorientation of the liquid crystal molecules, making such reorientation faster by two orders of magnitude or more depending upon the amplitude of the kicking voltage.

With reference again to FIG. 3, the fine tuning of the x- and y-direction position of the focal point 64 of a light beam 66 relative to the light-receiving end 18a of a receiving or output fiber 18 may be controlled utilizing known open or closed loop control techniques. For speed, open loop control is preferred since both switching and fine tuning can be performed substantially simultaneously. After assembly of the switch and fiber system, a light intensity analyzer is used to determine for each set of x- and y-direction adaptive coupler cells the voltages required to precisely align the focal point of a light beam with the light-receiving end of each output fiber. A lookup table is constructed from these data from which, during operation of the system, the appropriate corrections are retrieved and applied to the beam steering drive signals.

Figure 11:
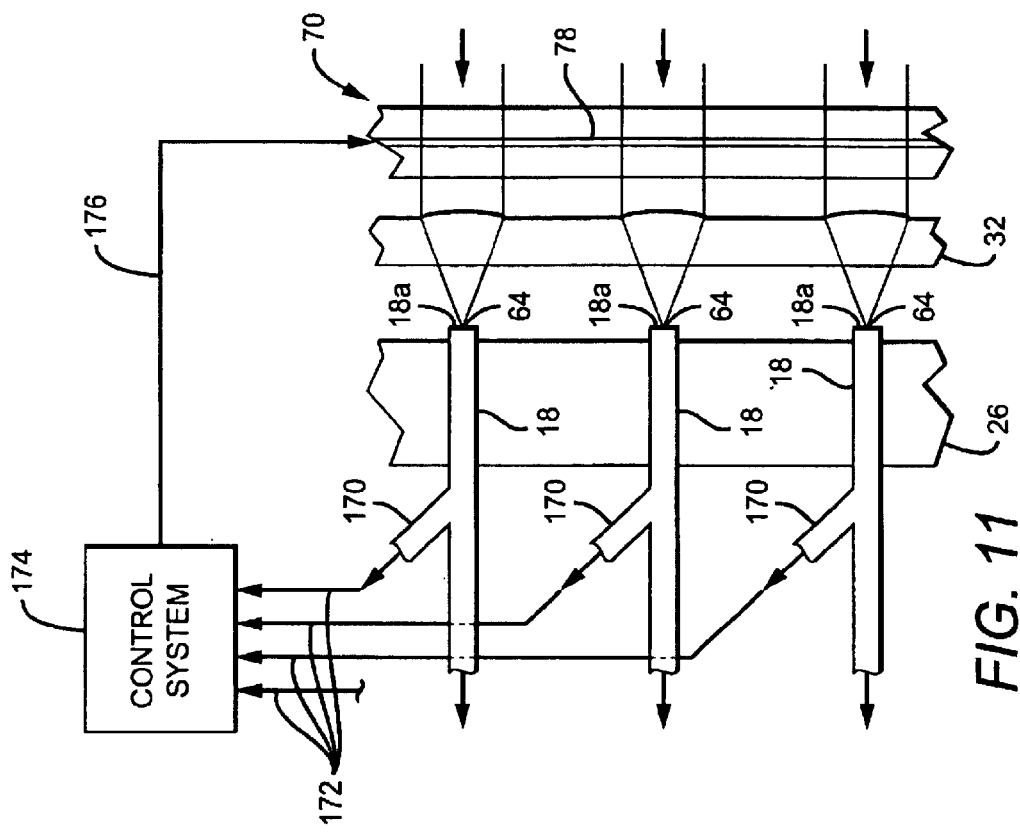
FIG. 11 is a simplified top plan view of a portion of an N×N optical switch incorporating closed loop feedback for controlling the energization of an adaptive coupler apparatus in accordance with the present invention.

FIG. 11 shows in simplified form a closed loop control arrangement as applied, for example, to the x-direction adaptive coupler 70 for fine tuning the x-direction position of the focal point 64 relative to the receiving end 18a of each output fiber 18. Each of the output fibers 18 includes a fiber optic cable splitter 170 for diverting a fraction of the detected light so as to provide a control beam 172. The control beams 172 are applied to a feedback control system 174 which compares the intensity of each of the control beams with a reference or target intensity and based thereon generates an error signal which is converted to electronic signals 176 applied to the x-direction cell electrodes 102 and 104 to control the electric field applied to the liquid crystal material 78. Such arrangement also enables equalizing the beam intensity in each fiber.

Figure 12:
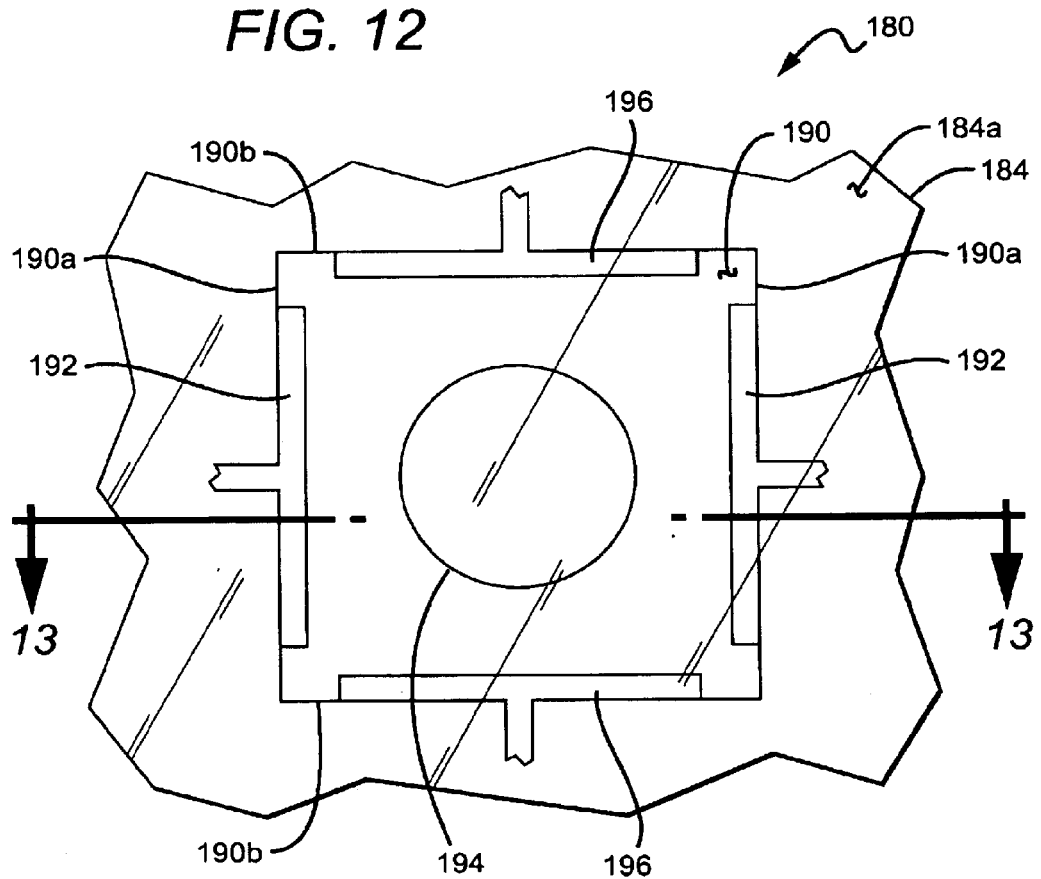
FIG. 12 is a front elevation view of an adaptive coupler cell in accordance with an alternative embodiment of the invention.
Figure 13:
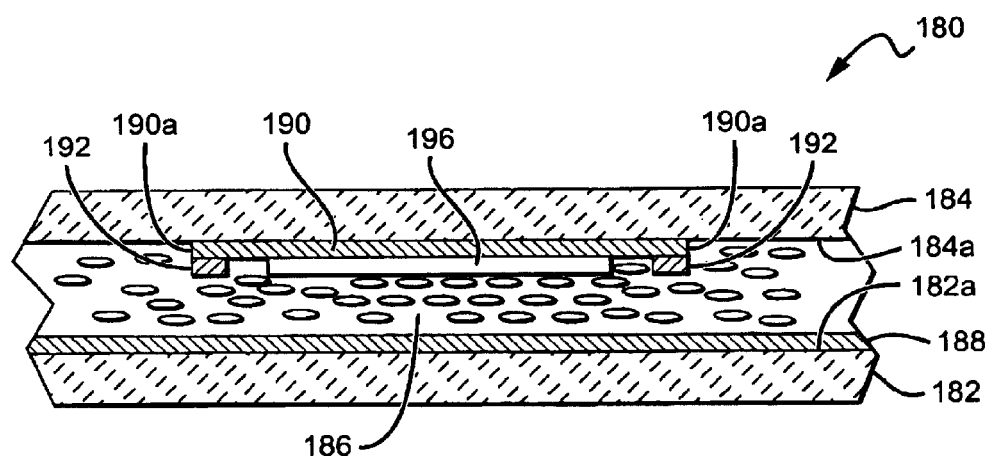
FIG. 13 is a cross section view of the cell of FIG. 12 as seen along the line 13—13 in FIG. 12.

FIGS. 12 and 13 are schematic representations of an alternative embodiment of the invention comprising a 2-dimensional, single pixel adaptive coupler cell 180 combining the functions of the separate, stacked x- and y-direction adaptive coupler cells described earlier. As before, the cell 180 comprises a pair of confronting, transparent glass substrates 182 and 184 sandwiching between polished inner surfaces 182a and 184a a liquid crystal material 186 preferably of the dual frequency kind. The inner surface 182a is coated with a thin, optically transparent, electrically conductive, constant potential (typically ground) electrode film 188 of, for example, doped zinc oxide, as already described, of a suitably low electrical resistivity. The inner surface 184a is coated with a thin, optically transparent electrically conductive film 190, also of doped zinc oxide having a suitably high electrical resistivity as described in connection with the previous embodiment. By way of example, the film 190 may have a square configuration with a pair of opposed, parallel, vertical edges 190a, and a pair of opposed parallel, horizontal edges 190b. Deposited over the film 190 along each vertical edge 190a is an electrode 192. The pair of vertical electrodes 192 serve to apply to the liquid crystal layer 186 a potential gradient controlling x-direction steering of the focal point of a light beam 194 intercepting the films. A similar pair of electrodes 196 deposited over the film 190 along the opposed horizontal edges 190b thereof function to apply to the liquid crystal layer 186 a potential gradient controlling y-direction steering. It will be evident that the application of selected control voltages to the x- and y-direction electrodes 192 and 196 will produce a linear potential gradient at any selected angle (also called the azimuthal angle) in the plane of the film 190 to steer the focal point of the light beam 194 2-dimensionally relative to the light-receiving end surface of an output fiber. Linearity, however, is confined to the central region of the cell. Such embodiments can also be utilized for optical beams of random polarization, for example, in a MEMS optical switch, with two liquid crystal cells stacked and their rubbing direction (liquid crystal alignment) perpendicular to each other.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An adaptive coupler for steering an optical beam, the adaptive coupler comprising:

a first substrate having a flat surface carrying a first, beam intercepting, optically transparent film of material having an electrical resistivity;

spaced apart electrodes in contact with said first film for applying a potential gradient across said first transparent film;

a second substrate having a flat surface, the flat surface of said second substrate confronting the flat surface of said first substrate and disposed parallel thereto, said flat surface of said second substrate carrying a second beam intercepting, optically transparent film comprising a constant potential electrode; and a dual frequency liquid crystal phase shifting medium disposed between said films on said confronting flat surfaces of said first and second substrates.

2. The adaptive coupler defined in claim 1 in which: said first and second films comprising zinc oxide.

3. The adaptive coupler defined in claim 1 which includes:

a third substrate having a flat surface carrying a third beam intercepting, optically transparent film, the third film having an electrical resistivity and including spaced apart electrodes for applying a potential gradient across said third transparent film, said potential gradient applied across said third film extending in a direction perpendicular to the direction of the potential gradient across said first film;

a fourth substrate having a flat surface, the flat surface of said fourth substrate confronting the flat surface of said third substrate and disposed parallel thereto, said flat surface of said fourth substrate carrying a fourth beam intercepting, optically transparent film comprising a constant potential electrode, said third and fourth substrates being disposed parallel with and adjacent to the first and second substrates; and a dual frequency liquid crystal phase shifting medium disposed between said third and fourth films on said confronting flat surfaces of said first and second substrates.

4. The adaptive coupler defined in claim 3 in which:

the third and fourth films comprise zinc oxide.

5. The adaptive coupler defined in claim 1 which includes:

a second pair of spaced apart electrodes in electrical contact with said film, the second pair of electrodes being substantially perpendicular to the first pair of spaced apart electrodes whereby, the application of selected voltages to said two pairs of electrodes produces a linear potential gradient at any selected angle in the plane of the film to provide 2-dimensional beam steering.

6. An adaptive coupler for steering an optical beam, the adaptive coupler comprising:

a pair of transparent substrates having confronting, parallel inner faces, the inner face of one of the pair of substrates carrying a beam intercepting, optically transparent, constant potential electrode and the inner face of the other of the pair of substrates carrying an electrically resistive, beam intercepting, optically transparent film;

a pair of spaced apart electrodes in electrical contact with said film for applying a potential gradient along said film; and an electro-optical phase shifting medium disposed between the confronting inner faces of said pair of substrates.

7. The adaptive coupler defined in claim 6 in which:

the electro-optical phase shifting medium comprises a liquid crystal medium.

8. The adaptive coupler defined in claim 7 in which:

the liquid crystal medium comprises a dual frequency liquid crystal medium.

9. The adaptive coupler defined in claim 6 in which:

the potential gradient is linear.

10. The adaptive coupler defined in claim 6 in which:

the film comprises a material having a high electrical resistivity.

11. The adaptive coupler defined in claim 10 in which:

said high electrical resistivity material comprises zinc oxide.

12. The adaptive coupler defined in claim 11 in which:

the zinc oxide is doped with alumina.

13. The adaptive coupler defined in claim 6 which includes:

a second pair of transparent substrates having confronting, parallel inner faces, the second pair of substrates being disposed parallel with said first-mentioned pair of substrates, the inner face of one of the second pair of substrates carrying a beam intercepting, optically transparent, constant potential electrode and the inner face of the other of the second pair of substrates carrying an electrically resistive, beam intercepting, optically transparent film, a pair of spaced apart electrodes in contact with said film for applying a potential gradient along said film in a direction perpendicular to the direction of the first-mentioned potential gradient, and an electro-optical phase shifting medium disposed between the confronting faces of said second pair of substrates.

14. The adaptive coupler defined in claim 13 in which:

the electro-optical phase shifting medium disposed between the confronting inner faces of said second pair of substrates comprises a liquid crystal medium.

15. The adaptive coupler defined in claim 14 in which:

the liquid crystal medium comprises a dual frequency liquid crystal medium.

16. The adaptive coupler defined in claim 13 in which:

the potential gradient is linear.

17. The adaptive coupler defined in claim 13 in which:

the film carried by the inner face of the other of the second pair of substrates comprises a material having a high electrical resistivity.

18. The adaptive coupler defined in claim 17 in which:

said high electrical resistivity material comprises zinc oxide.

19. The adaptive coupler defined in claim 18 in which:

the zinc oxide is doped with alumina.

20. The adaptive coupler defined in claim 6 which includes:

a second pair of spaced apart electrodes in electrical contact with said film, the second pair of electrodes being substantially perpendicular to the first pair of spaced apart electrodes whereby, the application of selected voltages to said two pairs of electrodes produces a linear potential gradient at any selected angle in the plane of the film to provide 2-dimensional beam steering.

* * * * *